(12) United States Patent
Lee et al.

(10) Patent No.: US 10,827,486 B2
(45) Date of Patent: Nov. 3, 2020

(54) RESOURCE ALLOCATION METHOD AND COMMUNICATION DEVICE

(71) Applicant: KT Corporation, Seongnam-si (KR)

(72) Inventors: Ki-Ho Lee, Suwon-si (KR); Byungsuk Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 15/745,506

(22) PCT Filed: Jun. 22, 2016

(86) PCT No.: PCT/KR2016/006602
§ 371 (c)(1),
(2) Date: Jan. 17, 2018

(87) PCT Pub. No.: WO2017/014435
PCT Pub. Date: Jan. 26, 2017

(65) Prior Publication Data
US 2018/0213529 A1   Jul. 26, 2018

(30) Foreign Application Priority Data

Jul. 17, 2015  (KR) .................. 10-2015-0101888
Jun. 21, 2016  (KR) .................. 10-2016-0077571

(51) Int. Cl.
*H04W 72/04*   (2009.01)
*H04L 5/14*    (2006.01)
(Continued)

(52) U.S. Cl.
CPC ....... *H04W 72/0446* (2013.01); *H04L 5/0048* (2013.01); *H04L 5/0053* (2013.01);
(Continued)

(58) Field of Classification Search
CPC ............ H04W 72/0446; H04W 72/042; H04L 5/0055; H04L 5/1469; H04L 5/0048; H04L 5/0053; H04B 7/26; H04B 7/2656
See application file for complete search history.

(56) References Cited

U.S. PATENT DOCUMENTS

2009/0067377 A1* 3/2009 Talukdar ............... H04L 5/0048
370/329
2009/0312073 A1* 12/2009 Park .................. H04W 52/0216
455/574
(Continued)

FOREIGN PATENT DOCUMENTS

EP       3 057 252 A1    8/2016
KR    10-2014-136923 A  12/2014
(Continued)

OTHER PUBLICATIONS

3GPP TSG RAN WG1 Meeting #51 BIS, R1-080175, "ACK/NACKS Transmission in UPPTS", Jan. 18, 2008, p. 1. (Year: 2008).*
(Continued)

*Primary Examiner* — Gregory B Sefcheck
*Assistant Examiner* — Joshua Smith
(74) *Attorney, Agent, or Firm* — Sughrue Mion, PLLC

(57) ABSTRACT

A resource allocation method is provided in which a resource allocation apparatus using a time-division duplex communication scheme allocates resources for a subframe. The resource allocation method includes: allocating a first time region of the time domain of the subframe as a downlink control information region; and allocating the rest of the time domain of the subframe, apart from the first time region, as at least one region variably selected from among a downlink data region, an uplink data region, an uplink control information region, and a guard period (GP) region.

13 Claims, 11 Drawing Sheets

(51) Int. Cl.
*H04B 7/26* (2006.01)
*H04L 5/00* (2006.01)

(52) U.S. Cl.
CPC .......... *H04L 5/0055* (2013.01); *H04L 5/1469* (2013.01); *H04W 72/042* (2013.01); *H04B 7/26* (2013.01)

(56) References Cited

U.S. PATENT DOCUMENTS

| | | | | |
|---|---|---|---|---|
| 2010/0014469 | A1* | 1/2010 | Xu | H04W 72/1289 370/329 |
| 2010/0246456 | A1* | 9/2010 | Suo | H04W 56/003 370/280 |
| 2011/0026461 | A1* | 2/2011 | Tee | H04L 5/0007 370/328 |
| 2011/0149813 | A1 | 6/2011 | Parkvall et al. | |
| 2013/0286902 | A1 | 10/2013 | Chen et al. | |
| 2014/0204807 | A1 | 7/2014 | Li et al. | |
| 2015/0043392 | A1* | 2/2015 | Susitaival | H04L 5/1469 370/280 |
| 2015/0078222 | A1* | 3/2015 | Yang | H04W 72/1257 370/280 |
| 2015/0085723 | A1* | 3/2015 | Chen | H04W 72/042 370/280 |
| 2016/0156494 | A1* | 6/2016 | Zhao | H04B 7/2656 370/476 |
| 2016/0242103 | A1* | 8/2016 | Mindru | H04J 11/0079 |
| 2016/0338049 | A1* | 11/2016 | Takeda | H04W 72/0446 |
| 2018/0176875 | A1* | 6/2018 | Tiirola | H04W 56/003 |

FOREIGN PATENT DOCUMENTS

| | | |
|---|---|---|
| KR | 10-1605979 B1 | 3/2016 |
| KR | 10-2016-0038001 A | 4/2016 |
| WO | 2012/138149 A2 | 10/2012 |
| WO | 2013/162785 A1 | 10/2013 |
| WO | 2015/014407 A1 | 2/2015 |
| WO | 2015/108008 A1 | 7/2015 |

OTHER PUBLICATIONS

Communication dated Jun. 25, 2018, from the European Patent Office in counterpart European Application No. 16827939.6.
Catania, Davide et al: "Flexible UL/DL in Small Cell TDD Systems: A Performance Study with TCP Traffic", IEEE 81 ST Vehicular Technology Conference 2015 (VTC Spring), May 11, 2015, pp. 1-6, XP033167363 (6 pages total).
"The Potential of Flexible UL/DL Slot Assignment in 5G Systems"; Catania, Davide et al.; published in Vehicular Technology Conference (VTC Fall), 2014 IEEE 80th; 7 pages.
International Search Report for PCT/KR2016/006602 dated Sep. 23, 2016 [PCT/ISA/210].
Communication dated Jun. 9, 2020 from European Patent Office in EP Application No. 16827939.6.

* cited by examiner

RESOURCE ALLOCATION METHOD AND COMMUNICATION DEVICE

TECHNICAL FIELD

The present invention relates to a resource allocation method and a communication apparatus.

BACKGROUND ART

Communication between a base station and a terminal consists of downlink (DL) transmission from the base station to the terminal and uplink (UL) transmission from the terminal to the base station.

The traditional IEEE 802.16e-based system profiles support Time-Division Duplex (TDD) which divides downlink transmission and uplink transmission with respect to the time domain.

In TDD, uplink transmission and downlink transmission are performed at different times in the same frequency band. TDD offers the advantage of allowing for convenient frequency-selective scheduling because the uplink channel characteristics and the downlink channel characteristics are reciprocal.

Conventionally, a wireless frame may consist of a plurality of flexible subframes. The plurality of flexible subframes may be used as downlink subframes or uplink subframes.

In this regard, a scheme was suggested in which one subframe is divided into a control region and a data region and downlink control information and uplink control information are included in the control region.

However, this scheme requires a time period for transmit-receive switching between the downlink control information and the uplink control information. Moreover, if downlink data comes after the uplink control information, transmit-receive switching occurs again. Thus, the time period for transmit-receive switching may be continuously repeated.

Another problem is that, if the uplink control information comes before the downlink data, ACK/NACK for the downlink data cannot be included.

DISCLOSURE

Technical Problem

The present invention provides a resource allocation method and a communication apparatus that allow for efficient use of frequency resources by using subframes flexibly in the uplink or downlink in a time-division duplex (TDD) communication system.

Technical Solution

According to an aspect of the present invention, there is provided a resource allocation method in which a resource allocation apparatus using a time-division duplex communication scheme allocates resources for a subframe, the resource allocation method including: allocating a first time region of the time domain of the subframe as a downlink control information region; and allocating the rest of the time domain of the subframe, apart from the first time region, as at least one region variably selected from among a downlink data region, an uplink data region, an uplink control information region, and a guard period (GP) region.

The downlink control information region may contain resource allocation information, and the uplink control information region may contain acknowledgment information on downlink data and resource request information.

The allocation as at least one region may include at least one among:

allocating the rest of the time domain as the downlink data region; allocating the rest of the time domain as the downlink data region, the guard period (GP) region, and the uplink control information region; allocating the rest of the time domain as the guard period (GP) region and the uplink data region; and allocating the rest of the time domain as the guard period (GP) region, the uplink data region, and the uplink control information region.

The allocation as at least one region may include:

allocating a second time region subsequent to the first time region as the downlink data region or the uplink data region; and allocating a third time region subsequent to the second time region as the uplink control information region.

The allocation as at least one region may further include:

allocating a guard period (GP) between the second time region and the third time region if the second time region is allocated as the downlink data region, and allocating the guard period (GP) between the first time region and the second time region if the second time region is allocated as the uplink data region.

The guard period may be allocated as a period for transmit-receive switching.

The second time region may include a region in which a demodulation reference signal DM-RS is allocated, and the demodulation reference signal may be allocated before downlink data or uplink data is allocated.

The second time region may be additionally allocated as an uplink control information region along with uplink data.

If there is no uplink data, the second time region may be allocated as an uplink control information region.

According to another aspect of the present invention, there is provided a resource allocation method in which a resource allocation apparatus using a time-division duplex communication scheme allocates resources for a subframe, the resource allocation method including: if the flexible subframe is configured as a downlink subframe, allocating the time domain of the downlink subframe as at least one downlink control information region, at least one downlink data region, and an uplink control information region; and if the flexible subframe is configured as an uplink subframe, allocating the time domain of the uplink subframe as at least one downlink control information region, at least one uplink data region, and an uplink control information region.

The at least one downlink control information region may be allocated to a time region preceding the uplink control information region.

A downlink subframe and an uplink subframe each may be a combination of at least two types of subframes, among first, second, third, and fourth types of subframes, wherein the first type of subframe may include the downlink control information region and the downlink data region, the second type of subframe may include the downlink control information region, the downlink data region, a guard period (GP) region, and an uplink control information region, the third type of subframe may include the downlink control information region, the guard period (GP) region, and the uplink data region, and the fourth type of subframe may include the downlink control information region, the guard period (GP) region, the uplink data region, and the uplink control information region.

The downlink subframe may be a sequence of at least one subframe of the first type and a subframe of the second type, and the uplink subframe may be a sequence of at least one subframe of the third type and a subframe of the fourth type.

The first type of subframe, the second type of subframe, the third type of subframe, and the fourth type of subframe may be given at TTIs (transmission time intervals).

According to still another aspect of the present invention, there is provided a communication apparatus including: a wireless communication unit that sends an uplink subframe or receives a downlink subframe; and a processor that processes the uplink subframe or the downlink subframe in accordance with a predefined subframe structure, wherein an uplink subframe or a downlink subframe may contain downlink control information, uplink data or downlink data, and uplink control information.

The uplink subframe may have a guard period (GP) between the downlink control information and the uplink data, and the downlink subframe may have a guard period (GP) between the downlink data and the uplink control information.

Upon receiving the downlink subframe, the processor may estimate the channel by receiving a demodulation reference signal (DM-RS) after receiving the downlink control information, and the channel estimation information may be used when demodulating downlink data which is to be received thereafter.

Upon sending the uplink subframe, the processor may send uplink data after sending a demodulation reference signal (DM-RS).

Upon sending the uplink subframe, the processor may mix the uplink data and the uplink control information up and send the same, or, if there is no uplink data, send the uplink control information in the region allocated for uplink data transmission.

Advantageous Effects

According to an exemplary embodiment of the present invention, 1 ms latency may be achieved by including downlink control information and uplink control information within one subframe.

Moreover, a guard period (GP) may be positioned in a period where uplink/downlink subframe switching occurs. In addition, uplink control information may come after downlink data, downlink control information may come before uplink data, and a guard period may come between the uplink control information and the downlink data. Thus, the guard period can be minimized, thereby maximizing efficiency.

MODE FOR INVENTION

Figure 1:
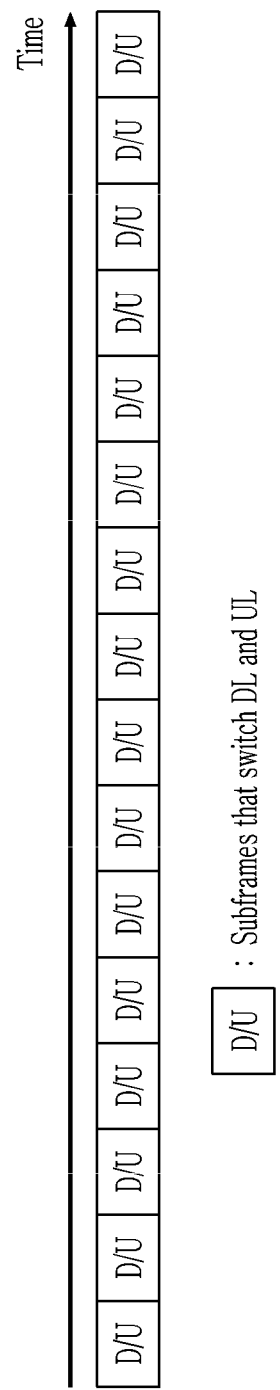
FIG. 1 is a schematic view of a wireless frame structure of a time-division duplex (TDD) communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

A terminal may designate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and include all or some of the functions of the terminal, MT, MS, AMS, HR-MS, SS, PSS, AT, UE, etc.

A base station (BS) may designate advanced base station (ABS), a high reliability base station (HR-BS), a small base station, a nodeB, an evolved node B (eNodeB), an access point (AP), a radio access station (RAS), a base transceiver station (BTS), a mobile multihop relay (MMR)-BS, etc., and include all or some of the functions of the BS, ABS, HR-BS, small base station, nodeB, eNodeB, AP, RAS, BTS, MMR-BS, RS, HR-RS, etc.

In a communication system, a communication apparatus may receive information via downlink and send information via uplink. Information sent and received by the communication apparatus includes data and various control information.

In the communication system, the communication apparatus may be a terminal, a base station, or a resource allocation apparatus in charge of resource allocation that is connected to the terminal and the base station. Also, the resource allocation apparatus may be included in the terminal or base station.

A radio frame or a wireless frame consists of a plurality of subframes. A basic unit for resource allocation may be called a TTI (transmission time interval). The TTI may be a basic unit of scheduling performed by a MAC (Medium Access Control) layer which is a higher layer of the physical layer. A basic unit of data transmission is a subframe, and downlink or uplink scheduling is performed in subframes.

In this specification, a physical frame structure commonly used in wireless communication systems is used. In an example, a physical frame structure for an LTE (Long Term Evolution) communication system may be used. That is, the concepts of subframe, slot, symbol, subcarrier, etc. in the physical frame structure for an LTE communication system may be used as reference in an exemplary embodiment of the present invention.

Now, a resource allocation method and a communication apparatus configuration according to an exemplary embodiment of the present invention will be described below with reference to the drawings.

FIG. 1 is a schematic view of a wireless frame structure of a time-division duplex (TDD) communication system according to an exemplary embodiment of the present invention.

Referring to FIG. 1, a wireless frame in a time-division duplex communication system consists of a plurality of flexible subframes.

The flexible subframes are configured as downlink (DL) subframes or uplink (UL) subframes.

These flexible subframes may have structures according to various exemplary embodiments, each of which will be described with reference to FIGS. 2 to 9.

In this regard, one subframe consists of a plurality of resource blocks, and the subframe may a basic unit for resource allocation.

Figure 2:
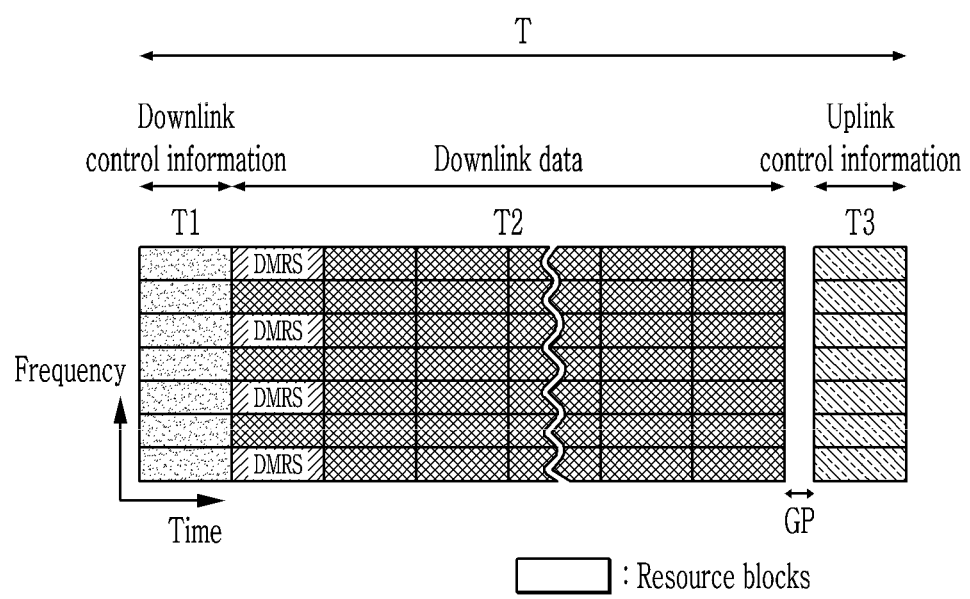
FIG. 2 shows a downlink subframe structure according to an exemplary embodiment of the present invention.
Figure 3:
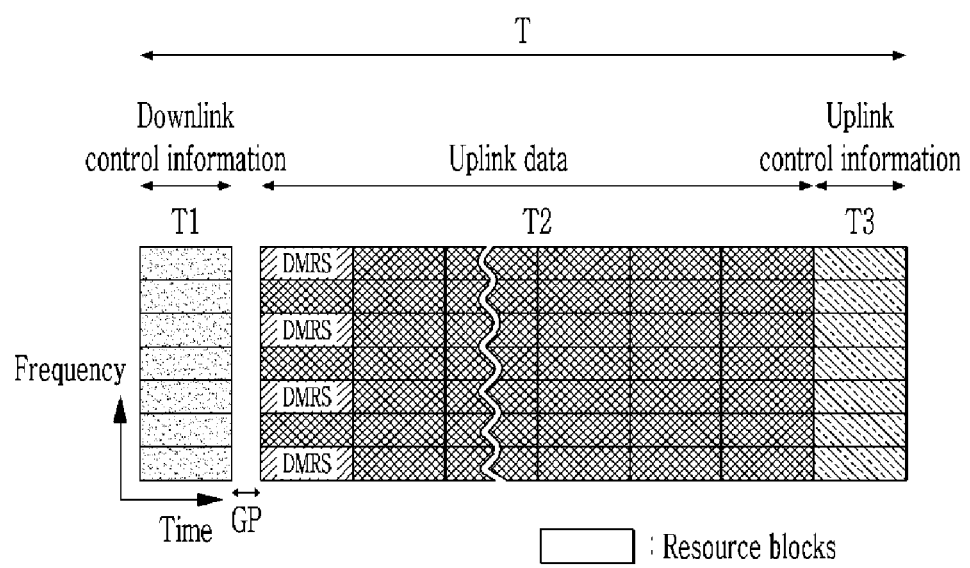
FIG. 3 shows an unlink subframe structure according to an exemplary embodiment of the present invention.

First of all, a flexible subframe structure according to an exemplary embodiment of the present invention may be implemented as in FIGS. 2 and 3.

FIG. 2 shows a downlink subframe structure according to an exemplary embodiment of the present invention. FIG. 3 shows an unlink subframe structure according to an exemplary embodiment of the present invention. Referring to FIG. 2, if a flexible subframe is configured as a downlink (DL) subframe, the time domain T of the downlink (DL) subframe includes a first time region T1 allocated as a downlink control (DL Control; DC) information region, a second time region T2 allocated as a downlink data (DL DATA; DD) region, a guard period (GP) region, and a third time region T3 allocated as an uplink control (UL Control; UC) information region.

Here, the first time region T1, the second time region T2, the GP region, and the third time region T3 are ordered in time.

Referring to FIG. 3, if a flexible subframe is configured as an uplink (UL) subframe, the time domain T of the uplink (UL) subframe includes a first time region T1 allocated as a downlink control (DL Control; DC) region, a guard period (GP) region, a second time region T2 allocated as an uplink data (UL DATA; UD) region, and a third time region T3 allocated as an uplink control (UL Control; UC) information region.

Here, the first time region T1, the GP region, the second time region T2, and the third time region T3 are ordered in time.

Referring to FIGS. 2 and 3, each time region consists of a plurality of resource blocks.

The downlink control information (DC) region contains resource allocation information. The resource allocation information includes frequency and time regions where resources are used, an MCS (Modulation Coding Scheme) for resources, and so on.

The uplink control information (UC) region is for sending an HARQ (Hybrid automatic repeat request) response ACK/NACK for downlink data in the uplink. Also, it is for sending feedback on an SR (Scheduling Request) for asking for resources, Channel State Information, etc.

A guard period GP is positioned between downlink data and uplink control information and between downlink control information and uplink data. Such a guard period is a period for transmit-receive switching.

With the guard period GP positioned between downlink data and uplink control information and between downlink control information and uplink data, a time period for processing response information on the downlink data may be provided.

Moreover, referring to FIG. 2, the resource blocks at the beginning of downlink data in the downlink data (DD) region includes a plurality of demodulation reference signals (DMRS) which are pilot information.

Here, the plurality of demodulation reference signals are positioned at the beginning of downlink data. As such, the communication apparatus may receive a demodulation reference signal first. Thus, downlink data demodulation is enabled after channel estimation through the demodulation reference signal, thereby making the data processing time faster.

Referring to FIG. 3, the uplink control information may be transmitted along with the uplink data during the second time region T2 in which uplink data is positioned.

Also, the second time region T2 of the time domain in which uplink data is positioned includes demodulation reference signals (DM-RS), which are positioned at the beginning of the uplink data. Here, the second time region T2 in which uplink data is positioned may be additionally allocated as an uplink control information region along with the uplink data.

In this regard, if there is no uplink data, the second time region T2 in which uplink data is positioned may be allocated as an uplink control information region. In this case, the uplink control information region T3 is allocated as well.

Next, a subframe structure according to another exemplary embodiment of the present invention may be implemented as in FIGS. 4, 5, 6, and 7.

Figure 4:
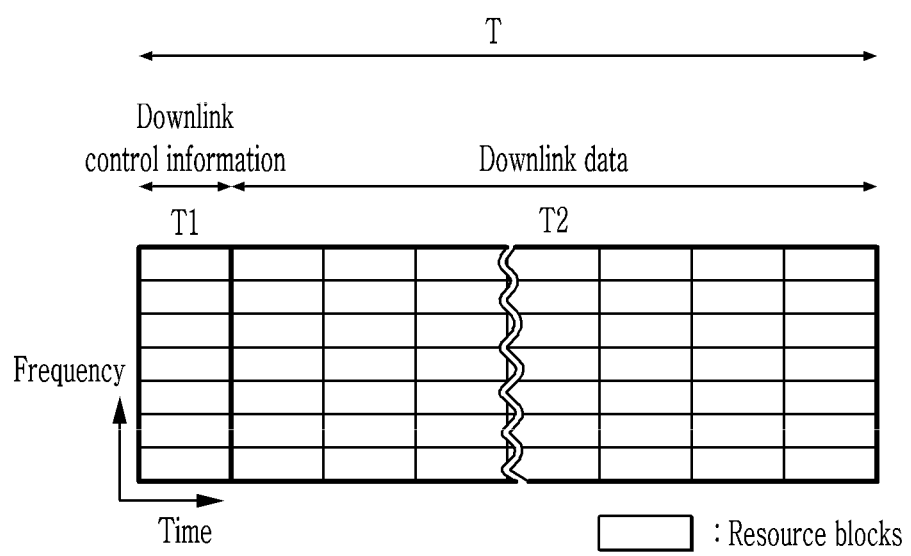
FIG. 4 shows the configuration of a first type of subframe according to another exemplary embodiment of the present invention.
Figure 5:
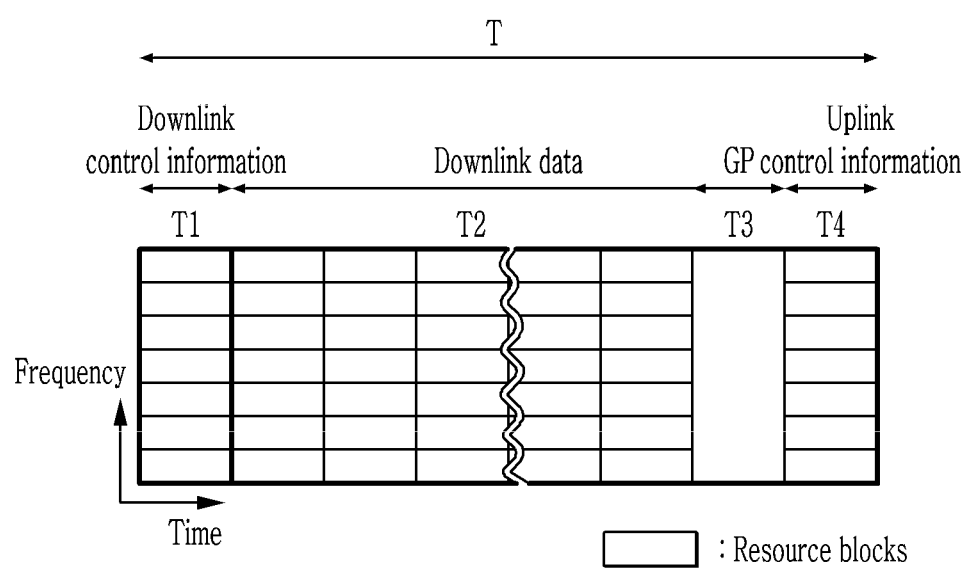
FIG. 5 shows the configuration of a second type of subframe according to another exemplary embodiment of the present invention.
Figure 6:
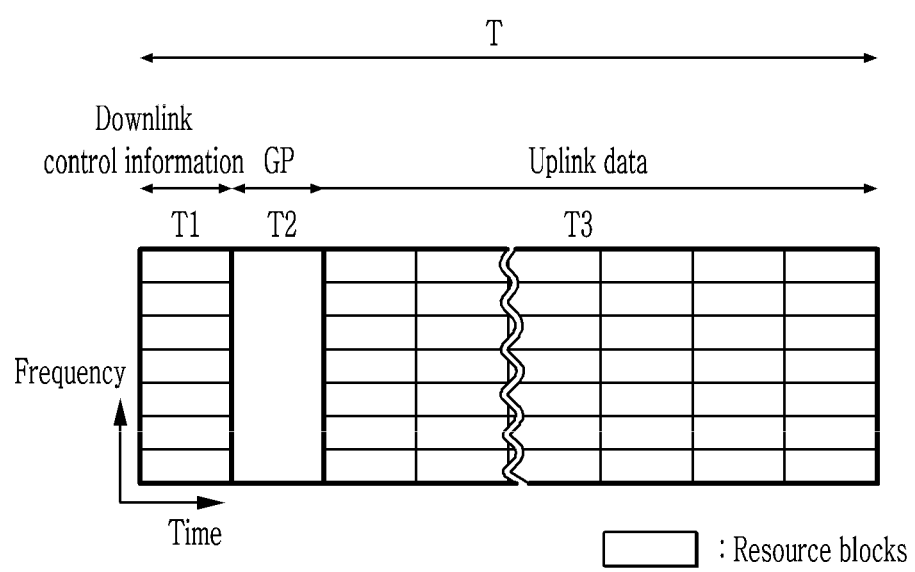
FIG. 6 shows the configuration of a third type of subframe according to another exemplary embodiment of the present invention.
Figure 7:
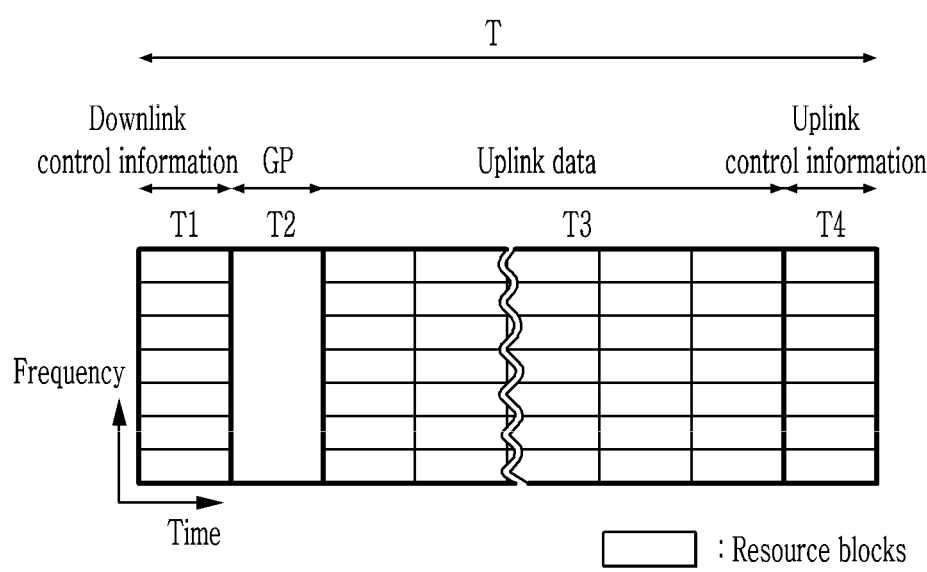
FIG. 7 shows the configuration of a fourth type of subframe according to another exemplary embodiment of the present invention.

In this regard, a subframe may be implemented in four types. FIG. 4 shows the configuration of a first type of subframe according to another exemplary embodiment of the present invention. FIG. 5 shows the configuration of a second type of subframe according to another exemplary embodiment of the present invention. FIG. 6 shows the configuration of a third type of subframe according to another exemplary embodiment of the present invention. FIG. 7 shows the configuration of a fourth type of subframe according to another exemplary embodiment of the present invention.

That is, the flexible subframe of FIG. 1 may be variably selected from among first, second, third, and fourth types of subframes.

Referring to FIG. 4, if the flexible subframe is configured as a first type of subframe, the first time region T1 of the time domain T of the first type of subframe is allocated as a downlink control information (DC) region, and the second time region T2 is allocated as a downlink data (DD) region.

Referring to FIG. 5, if the flexible subframe is configured as a second type of subframe, the first time region T1 of the time domain T of the second type of subframe is allocated as a downlink control information (DC) region, the second time region T2 is allocated as a downlink data (DD) region, the third time region T3 is allocated as a GP region, and the fourth time region T4 is allocated as an uplink control information (UC) region.

Referring to FIGS. 4 and 5, DMRSs may be allocated first at the beginning of downlink data DD in the second time region T2, and then the downlink data DD may be allocated.

Referring to FIG. 6, if the flexible subframe is configured as a third type of subframe, the first time region T1 of the time domain T of the third type of subframe is allocated as a downlink control information (DC) region, the second time region T2 is allocated as a GP region, and the third time region T3 is allocated as an uplink data (UD) region.

Referring to FIG. 7, if the flexible subframe is configured as a fourth type of subframe, the first time region T1 of the time domain T of the fourth type of subframe is allocated as a downlink control information (DC) region, the second time region T2 is allocated as a GP region, the third time region T3 is allocated as an uplink data (UD) region, and the fourth time domain T4 is allocated as an uplink control information (UC) region.

Referring to FIGS. 6 and 7, DMRSs may be allocated first at the beginning of uplink data UD in the second time region T2, and then the uplink data DD may be allocated.

Also, uplink control information may be additionally allocated to the uplink data (UD) region along with uplink data.

In this regard, if there is no uplink data, uplink control information may be allocated to the uplink data (UD) region, and the uplink control information region T3 is provided separately.

Next, according to still another exemplary embodiment of the present invention, a flexible subframe may be a combination of at least two types of subframes, among the first, second, third, and fourth types of subframes explained with reference to FIGS. 4 to 7.

Figure 8:
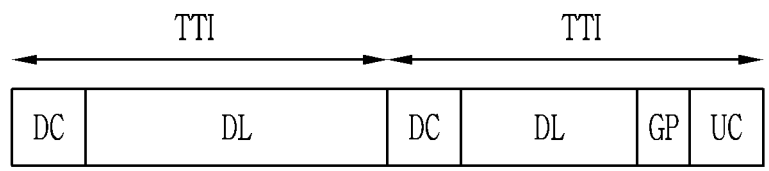
FIG. 8 schematically shows the configuration of a downlink subframe according to still another exemplary embodiment of the present invention.
Figure 9:
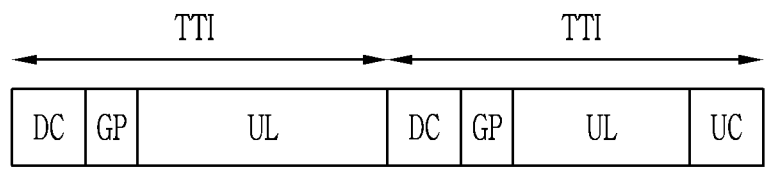
FIG. 9 schematically shows the configuration of an uplink subframe according to a further exemplary embodiment of the present invention.

FIG. 8 schematically shows the configuration of a downlink subframe according to still another exemplary embodiment of the present invention. FIG. 9 schematically shows the configuration of an uplink subframe according to a further exemplary embodiment of the present invention.

Referring to FIG. 8, the downlink (DL) subframe may include a structure in which the first type of subframe of FIG. 4 and the second type of subframe of FIG. 5 are consecutively arranged.

Referring to FIG. 9, the uplink (UL) subframe may include a structure in which the third type of subframe FIG. 6 and the fourth type of subframe of FIG. 7 are consecutively arranged.

In this regard, each type of subframe—that is, the first type of subframe, the second type of subframe, the third type of subframe, and the fourth type of subframe—may be given at TTIs.

Figure 10:
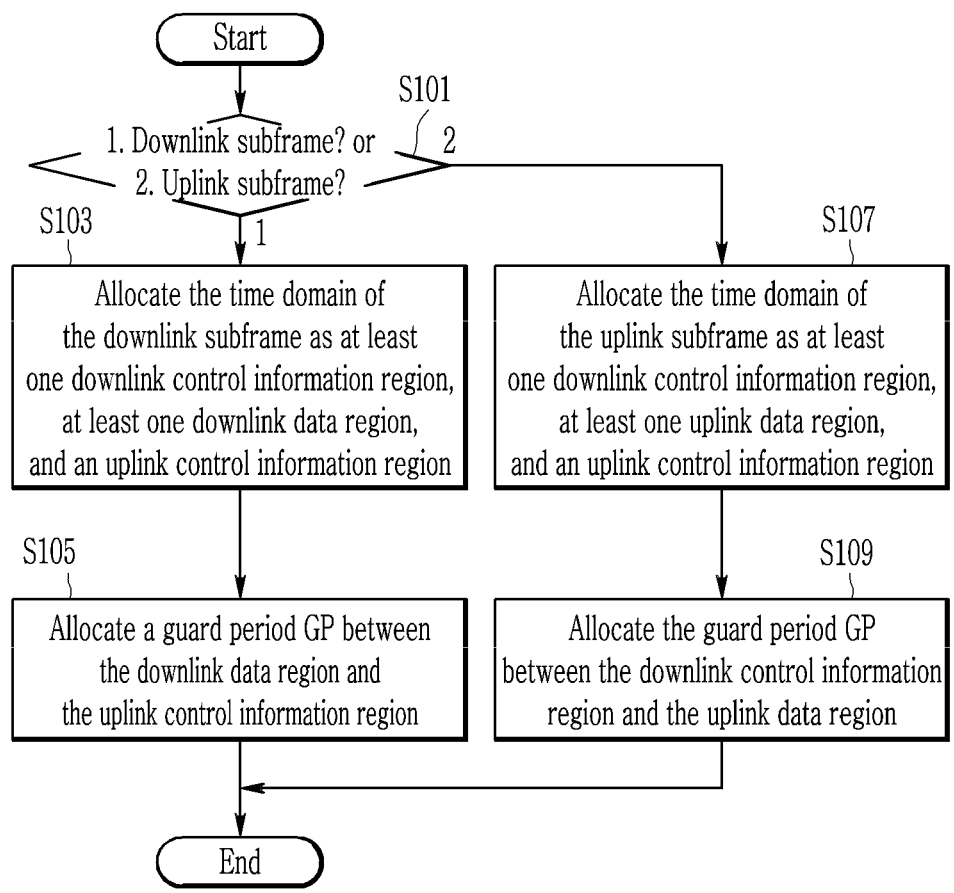
FIG. 10 is a schematic flowchart of a resource allocation method for subframes according to an exemplary embodiment of the present invention.

Next, FIG. 10 shows a series of processes in which a resource allocation apparatus using a time-division duplex communication scheme allocates resources for subframes. The resource allocation apparatus may be included in a terminal or a base station, or may be implemented as a separate piece of equipment on a network.

Referring to FIG. 10, if a certain flexible subframe is configured as a downlink subframe (S101), the resource allocation apparatus allocates the time domain T of the downlink subframe as at least one downlink control information region, at least one downlink data region, and an uplink control information region (S103).

In this regard, a guard period GP is allocated between the downlink data region and the uplink control information region (S105). The step S105 applies to the subframes of FIG. 2, FIG. 5, and FIG. 8.

On the other hand, if a certain flexible subframe is configured as an uplink subframe in the step S101, the resource allocation apparatus allocates the time domain T of the uplink subframe as at least one downlink control information region, at least one uplink data region, and an uplink control information region (S107).

In this regard, a guard period GP is allocated between the downlink control information region and the uplink data region (S109). The step S109 applies to the subframes of FIG. 3, FIG. 6, FIG. 7, and FIG. 9.

Figure 11:
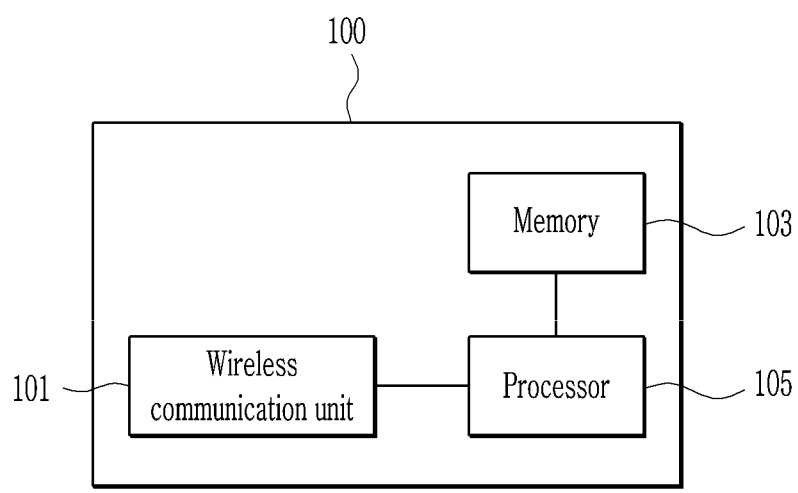
FIG. 11 shows the configuration of a communication apparatus according to an exemplary embodiment of the present invention.

FIG. 11 shows the configuration of a communication apparatus according to an exemplary embodiment of the present invention.

Referring to FIG. 11, the communication apparatus 100 includes a wireless communication unit 101, a memory 103, and a processor 105.

The processor 105 may be configured to implement the procedures and/or methods proposed in the exemplary embodiments of the present invention. The memory 103 is connected to the processor 105 and stores various information relating to the operation of the processor 105. The wireless communication unit 101 is connected to the processor 105 and sends and/or receives wireless signals.

The processor 105 may also be referred to as a controller, a microcontroller, a microprocessor, a microcomputer, or the like. Also, the processor 105 may be implemented by hardware, firmware, software, or a combination thereof.

The processor 105 controls the wireless communication unit 101 to send and receive signals using uplink subframes or downlink subframes in accordance with the subframe structures explained with reference to FIGS. 2 to 9.

Here, the wireless communication unit 101 sends an uplink subframe or receives a downlink subframe.

The processor 105 processes the uplink subframe or downlink subframe in accordance with a predefined subframe structure stored in the memory 103.

Upon receiving the downlink subframe, the processor 105 estimates the channel by receiving a demodulation reference signal DM-RS after receiving downlink control information. Then, the estimated information is used when demodulating downlink data which is to be received thereafter. Accordingly, channel estimation may be done first and then data is received, thereby making the data processing time faster, unlike in the conventional art where channel estimation is enabled only after all data is received because pilot information is included in downlink data.

Moreover, upon sending the uplink subframe, the processor 105 sends uplink data after sending a demodulation reference signal DM-RS.

In addition, upon sending the uplink subframe, the processor 105 may mix uplink data and uplink control information up and send them in the same time region. Alternatively, if there is no uplink data, the uplink control information may be sent in the time region allocated for uplink data. In this way, the uplink control information may be sent in the uplink data region which provides high output. Moreover, the uplink control information may be sent in the uplink data region, and the uplink control information may be repeatedly sent in the uplink control information region.

The above-explained exemplary embodiments of the present invention are not implemented only by a device and/or a method, but may be implemented through a program for realizing functions corresponding to the configurations of the exemplary embodiments of the present invention and a recording medium having the program recorded thereon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A resource allocation method in which a resource allocation apparatus using a time-division duplex (TDD) communication scheme allocates resources for a subframe, the resource allocation method comprising:
    allocating time regions to a certain flexible subframe, the allocating of the time regions to the certain flexible subframe comprising:
        allocating exclusively a first time region of a time domain of the certain flexible subframe as a downlink control information region; and
        allocating the rest of the time domain of the certain flexible subframe, after the first time region, as at least one region variably selected from among a downlink data region, an uplink data region, an uplink control information region, or a guard period (GP) region,
    wherein the allocating the rest of the time domain of the certain flexible subframe comprises:
        if the certain flexible subframe is to be configured as a downlink subframe, allocating all of the rest of the time domain of the certain flexible subframe such that the rest of the time domain of the downlink subframe includes, in the following order, a time region allocated as the downlink data region, the GP region, and a time region allocated as the uplink control information region; and
        if the certain flexible subframe is to be configured as an uplink subframe, allocating all of the rest of the time domain of the certain flexible subframe such that the rest of the time domain of the uplink subframe includes, in the following order, the GP region, a time region allocated as the uplink data region, and a time region allocated as the uplink control information region.

2. The resource allocation method of claim 1, wherein the downlink control information region contains resource allocation information, and
the uplink control information region contains acknowledgment information on downlink data and resource request information.

3. The resource allocation method of claim 1, wherein the GP region is a region allocated as a period for transmit-receive switching.

4. The resource allocation method of claim 1, wherein
the uplink data region comprises a region in which a demodulation reference signal (DM-RS) is allocated, and
the demodulation reference signal is allocated before uplink data is allocated.

5. The resource allocation method of claim 1, wherein the uplink data region is additionally allocated as the uplink control information region along with uplink data.

6. The resource allocation method of claim 5, wherein, if there is no uplink data, the uplink data region is allocated as the uplink control information region.

7. The resource allocation method of claim 1, wherein a plurality of demodulation reference signals are positioned at the beginning of the downlink data or the uplink data.

8. The resource allocation method of claim 7, further comprising: enabling demodulation after channel estimation based on at least one of the demodulation reference signals.

9. A resource allocation method in which a resource allocation apparatus using a time-division duplex (TDD) communication scheme allocates resources for a subframe, the resource allocation method comprising:
    allocating time regions to a certain flexible subframe, the allocating of the time regions to the certain flexible subframe comprising:
        allocating exclusively a first time region of a time domain of the certain flexible subframe as a downlink control information region; and
        allocating the rest of the time domain of the certain flexible subframe, after the first time region, as at least one region variably selected from among a downlink data region, an uplink data region, an uplink control information region, or a guard period (GP) region, wherein the allocating the rest of the time domain of the certain flexible subframe comprises:
            if the certain flexible subframe is to be configured as a downlink subframe, allocating sequentially the rest of the time domain of the certain flexible subframe in the following order: the downlink data region, the GP region, and the uplink control information region, such that the GP region is allocated between the downlink data region and the uplink control information region; and
            if the certain flexible subframe is to be configured as an uplink subframe, allocating sequentially the rest of the time domain of the certain flexible subframe in the following order: the GP region, and the uplink data region, such that the GP region is allocated between the at least one downlink control information region, and at least one uplink data region.

10. A communication apparatus comprising:
a wireless communication interface that is configured to transmit flexible subframes; and
a processor that is configured to process the flexible subframes in accordance with structures of the respective subframes,
wherein the processor is further configured to allocate time regions to a certain flexible subframe, the allocating of the time regions to the certain flexible subframe comprising:
    allocating exclusively a first time region of a time domain of the certain flexible subframe as a downlink control information region; and
    allocating the rest of the time domain of the certain flexible subframe, behind the first time region, as at least one region variably selected from among a downlink data region, an uplink data region, an uplink control information region, or a guard period (GP) region,
    wherein the allocating the rest of the time domain of the certain flexible subframe comprises:
        if the certain flexible subframe is to be configured as a downlink subframe, allocating all of the rest of the time domain of the certain flexible subframe such that the rest of the time domain of the downlink subframe includes, in the following order, a time region allocated as the downlink data region, the GP region, and a time region allocated as the uplink control information region; and if the certain flexible subframe is to be configured as an uplink subframe, allocating all of the rest of the time domain of the certain flexible subframe such that the rest of the time domain of the uplink subframe includes, in the following order, the GP region, a time region allocated as the uplink data region, and a time region allocated as the uplink control information region.

11. The communication apparatus of claim 10, wherein, upon receiving the certain flexible subframe that is configured as the downlink subframe, the processor is further configured to:

estimate a channel by receiving a demodulation reference signal (DM-RS) after receiving downlink control information, and use channel estimation information when demodulating downlink data which is to be received thereafter.

12. The communication apparatus of claim 11, wherein, based on sending the certain flexible subframe that is configured as the uplink subframe, the processor is further configured to send uplink data after sending a demodulation reference signal (DM-RS).

13. The communication apparatus of claim 12, wherein, based on sending the certain flexible subframe that is configured as the uplink subframe, the processor is further configured to mix the uplink data and uplink control information up and send the same, or, if there is no uplink data, send the uplink control information in a region allocated for uplink data transmission.

* * * * *